Patented June 21, 1938

2,121,017

UNITED STATES PATENT OFFICE 2,121,017

BETA-NAPHTHOL MONOAZO ALKOXY-NITROPHENYL DYES

Troy Lee Cantrell and James Otho Turner, Lansdowne, Pa., assignors to Gulf Oil Corporation, Pittsburgh, Pa., a corporation of Pennsylvania No Drawing. Original application September 2, 1936, Serial No. 99,161. Divided and this application February 6, 1937, Serial No. 124,513

7 Claims. (Cl. 260—91)

This invention relates to azo dyes derived from beta-naphthol and it comprises yellow azo dyes useful for improving and coloring petroleum products such as gasoline, kerosene, mineral lubricating oils, specialty oil, etc., such dyes being mono-azo compounds wherein the beta-naphthol is coupled by the azo group to a nitro-phenyl alkoxy-ether and it also comprises methods of making such dyes wherein 2-alkoxy-5-nitro-phenylamine is diazotized and coupled with beta-naphthol to form a yellow dye soluble in petroleum products; all as more fully hereinafter set forth and as claimed.

In our companion application, Serial No. 99,161, filed September 2, 1936, we describe and claim the azo dyes wherein the beta-naphthol is coupled by the azo group to an ortho-substituted phenyl ether and the manufacture of such beta-naphthol azo dyes. The present application is a division of Serial No. 99,161 and is directed to the beta-naphthol azo dyes obtained from 2-alkoxy-5 phenylamine and methods of making the same.

In our copending applications Serial Nos. 99,159 and 99,158, we describe and claim certain improved petroleum products, such as mineral lubricating oils, gasoline, etc., containing a minor amount of a beta-naphthol azo nitrophenyl ether and the methods of producing such improved compositions; the two applications being directed to thioethers and oxy-ethers, respectively.

The beta-naphthol azo-nitro-phenyl oxy-ethers, to which the present application is directed, in addition to being useful as improvement agents for petroleum products are generally useful for other purposes.

This new class of mono-azo compounds may be represented by the following formula:—

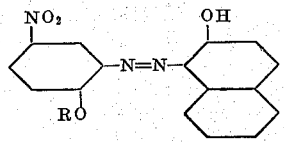

wherein R represents an alkyl group.

These dyes are oil-soluble, but are substantially insoluble in water. They are generally soluble in hydrocarbons and in alcohols.

In our companion application, Ser. No. 98,828, filed August 31, 1936, we described the production of new alkyl ether compounds and reducing at least one nitro group to an amino group. The new alkyl oxy-ethers obtained by the processes in which the nitro-chlorbenzenes are condensed with metal-alcoholate, are useful for the present purposes. They may be represented by the following formula:—

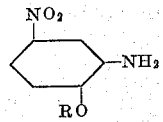

wherein R is an alkyl group.

The following nitro-amino ethers are typical of those which we have found useful in the manufacture of beta-naphthol azo compounds and they are given as illustrative of the present invention:

Ethyl oxy-ether of ortho-amino-para-nitro benzene.

Propyl oxy-ether of ortho-amino-para-nitro benzene.

Butyl oxy-ether of ortho-amino-para-nitro benzene.

Amyl oxy-ether of ortho-amino-para-nitro benzene.

The 2-ethoxy-5-nitro phenylamine when diazotized and coupled with beta-naphthol yield a particularly advantageous dye. The mono-azo dye obtained from the corresponding amyl ether, is likewise advantageous, it being readily soluble in mineral lubricating oils.

In preparing the azo dyes, the amino ether is diazotized and then coupled with beta-naphthol. Usually the amino-nitro ether is mixed with a molar amount of dilute hydrochloric acid and the solution is cooled to about 40° F. To the cooled solution one molar equivalent of sodium nitrite, dissolved in water, is added. The nitrite is gradually added, the mixture being maintained at 40° F. by cooling.

After the diazotization reaction is complete, the coupling with the naphthol is effected. In this operation, sufficient beta-naphthol to combine with the azo compound is dissolved in aqueous caustic solution and the solution so obtained is cooled to below 40° F.

The cool mixture containing the diazonium chloride is then slowly added to the pre-cooled solution of naphthol. During the coupling, the reaction mixture is maintained at the said temperature and vigorously stirred during the mixing of the solutions. The mixture is further stirred until the coupling is substantially complete.

These nitrophenyl oxy-ether azo dyes, being insoluble in water, are precipitated as formed. By filtering the mixture, the crystalline dyestuff is recovered. It may be washed with acidulated water to remove the adhering reaction liquor and sodium chloride. The washed crystals may be air dried.

These azo dyes, so obtained, range in color from light yellow to brilliant orange, depending upon the substituent group attached to the ether linkage. These azo compounds color or dye various materials in similar shades. The coloring produced is substantially permanent as these azo compounds are relatively resistant to change by light or oxidation, as customarily encountered when such dyed materials are subjected to atmospheric conditions or to the ordinary conditions under which they are used.

In the practice of this invention, in addition to obtaining the azo compounds directly as a dyestuff or coloring agent, it is formed in situ on and in cloth and other fabrics, such as cotton, wool, silk, rayon, cellulose esters, etc. That is, the fabric or cloth is impregnated with one of the components and then the dyestuff developed with the other component. However, for many purposes, it is advantageous to obtain the dyestuff as a dry product and then compound it with the materials to be colored and otherwise improved. In our copending application Ser. No. 98,826, filed August 31, 1936, we have shown that generally alkyl ethers having a nitrogen-containing substituent in the benzene nucleus, such as nitro, amino, or azo groups in the positions ortho or para to the ether group thereof are advantageous as improvement agents for mineral oils. The azo dyes of the present invention contain similar structural characteristics in addition to having a naphthol group present and they are useful in improving mineral lubricating oils.

That is, these azo compounds are advantageous addition agents for petroleum products such as lubricating oil, special oil, and gasoline, kerosene, etc.

The azo compounds also impart a distinctive color to the petroleum composition, thus readily distinguishing it from other petroleum products. In this way the improved composition may be identified by visual inspection from the base petroleum composition employed in making it.

Also, the presence of the beta-naphthol group in these azo dyes is advantageous as pointed out in Serial No. 98,826. Naphthol itself has been used as an improvement agent for cracked gasolines, the function of the beta-naphthol group being to inhibit deteriorative changes by oxidation, etc. in the gasoline.

The specific example given post is expositive of some particular embodiments of the present invention, and it is presented by way of illustration thereof. In this example the parts given are parts by weight.

*Example.*—In preparing the 1-ethoxy-4-nitro-phenyl-2-azo beta-naphthol, 193 pounds of the ethyl oxy-ether of para-nitro-ortho-amino benzene are dissolved in 2000 pounds of dilute hydrochloric acid, commercial acid containing 3.6 per cent hydrogen chloride. The mixture is cooled to about 40° F. To the cooled mixture, there is gradually added 700 pounds of an aqueous solution of sodium nitrite containing 70 pounds of sodium nitrite. During this time the mixture is thoroughly agitated and maintained at said temperature by suitable cooling means. After all the nitrite has been added this mixture is further agitated until the diazotization has been completed, about eight hours being required. The diazotized ether so obtained is then coupled with beta-naphthol by the procedure given ante in this specification, to produce the 1-ethoxy-4-nitro phenyl-2-azo beta-naphthol.

The dyestuff so obtained is filtered off from the mother liquor, washed and then dried in a current of warm air. It has a yellowish-orange color and dyes petroleum products in like shade.

In the above example, the amyl, propyl and butyl oxyethers of para-nitro benzene may be employed to prepare the similar dyes from beta-naphthol, the amount of such alkyl oxy-ethers being adjusted according to the variation in molecular weight.

What we claim is:

1. In the manufacture of beta-naphthol azo dyes, the improvement which comprises coupling beta-naphthol with a diazotized nitro-amino phenyl alkyl ether having the following formula

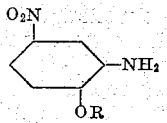

wherein R is an alkyl group, and then recovering the dyestuff so obtained.

2. The process of claim 1 wherein said ether is an ethyl ether.

3. The process of claim 1 wherein said ether is an amyl ether.

4. As an improved azo dye, the alkyl oxy-ethers of 4-nitro-phenyl-2-azo beta-naphthol.

5. The dye of claim 4 wherein said oxy-ether compound is an ethyl oxy-ether.

6. The dye of claim 4 wherein said oxy-ether compound is an amyl oxy-ether.

7. As a new beta-naphthol azo dye having yellow to orange color, a beta-naphthol azo nitrophenyl alkyl ether, having the following formula

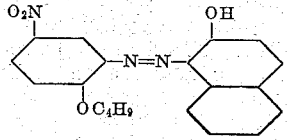

TROY LEE CANTRELL.
JAMES OTHO TURNER.